US009535851B2

(12) United States Patent
Stark et al.

(10) Patent No.: US 9,535,851 B2
(45) Date of Patent: Jan. 3, 2017

(54) TRANSACTIONAL MEMORY THAT PERFORMS A PROGRAMMABLE ADDRESS TRANSLATION IF A DAT BIT IN A TRANSACTIONAL MEMORY WRITE COMMAND IS SET

(71) Applicant: Netronome Systems, Inc., Santa Clara, CA (US)

(72) Inventors: Gavin J. Stark, Cambridge (GB); Rolf Neugebauer, Cambridge (GB)

(73) Assignee: Netronome Systems, Inc., Santa Clara, CA (US)

( * ) Notice: Subject to any disclaimer, the term of this patent is extended or adjusted under 35 U.S.C. 154(b) by 116 days.

(21) Appl. No.: 14/172,856

(22) Filed: Feb. 4, 2014

(65) Prior Publication Data

US 2015/0220445 A1    Aug. 6, 2015

(51) Int. Cl.
G06F 12/10 (2016.01)
G06F 9/46 (2006.01)
G06F 13/38 (2006.01)

(52) U.S. Cl.
CPC ............ G06F 12/109 (2013.01); G06F 9/467 (2013.01); G06F 13/385 (2013.01); *G06F 2212/151* (2013.01); *G06F 2212/657* (2013.01); *G06F 2213/0026* (2013.01)

(58) Field of Classification Search
CPC ......................................... G06F 12/10–12/109
See application file for complete search history.

(56) References Cited

U.S. PATENT DOCUMENTS

| 7,945,760 B1* | 5/2011 | Barry ................. G06F 9/30032 711/202 |
|---|---|---|
| 2013/0339562 A1* | 12/2013 | Greiner et al. ............... 710/262 |
| 2014/0025920 A1* | 1/2014 | Stark et al. .................... 711/206 |
| 2014/0129799 A1* | 5/2014 | Fleischer et al. ............. 711/207 |

* cited by examiner

*Primary Examiner* — Nicholas Simonetti
(74) *Attorney, Agent, or Firm* — Imperium Patent Works LLP; T. Lester Wallace; Mark D. Marrello

(57) ABSTRACT

A transactional memory receives a command, where the command includes an address and a novel DAT (Do Address Translation) bit. If the DAT bit is set and if the transactional memory is enabled to do address translations and if the command is for an access (read or write) of a memory of the transactional memory, then the transactional memory performs an address translation operation on the address of the command. Parameters of the address translation are programmable and are set up before the command is received. In one configuration, certain bits of the incoming address are deleted, and other bits are shifted in bit position, and a base address is ORed in, and a padding bit is added, thereby generating the translated address. The resulting translated address is then used to access the memory of the transactional memory to carry out the command.

20 Claims, 10 Drawing Sheets

TRANSLATION OF HOST ADDRESS SPACE
INTO CLS MEMORY ADDRESS SPACE

PHYSICAL SERVER MACHINE

NETWORK FLOW PROCESSOR OF
THE NETWORK INTERFACE DEVICE

INGRESS PCIe ISLAND

PCIe BLOCK IN MORE DETAIL

TRANSLATION OF HOST ADDRESS SPACE
INTO CLS MEMORY ADDRESS SPACE

HOST ADDRESS SPACE TO NID MEMORY SPACE
ADDRESS TRANSLATION OPERATION

ADDRESS TRANSLATOR IN THE CLS PIPELINE

TRANSACTIONAL MEMORY THAT PERFORMS A PROGRAMMABLE ADDRESS TRANSLATION IF A DAT BIT IN A TRANSACTIONAL MEMORY WRITE COMMAND IS SET

TECHNICAL FIELD

The described embodiments relate generally to transactional memories, and more particularly to transactional memories involved in the configuration of virtual Network Interface Devices (virtual NIDs), and to related methods and structures.

BACKGROUND INFORMATION

A web server usable for providing web hosting services may involve a physical server machine and a Network Interface Device (NID). The NID may take the form of an expansion card that is coupled to the motherboard of the physical server machine via a PCIe bus. The NID provides internet and network connectivity to the server machine. The resources of the server machine may be partitioned and allocated by a hypervisor so that multiple separate virtual machines can operate simultaneously on the same one physical server machine without interacting with each other. Similarly, the resources of the NID may be partitioned and allocated so that the NID functions as multiple virtual NIDs. The single physical server machine can therefore function as multiple separate virtual servers, with each separate virtual server involving a virtual machine and an associated virtual NID. In the web hosting business, a company that owns such a physical server can lease use of individual virtual servers and internet connectivity to individual customers. An individual customer may of the web hosting company may, for example, use such a leased virtual server to host the customer's website even though the actual physical server hardware being used is owned by the web hosting company and is also being used by many other website operators. There are many different architectures that can be employed to realize NIDs for web servers. In one example, a high-performance and intelligent Island-Based Network Flow Processor (IB-NFP) available from Netronome Systems Inc. of Santa Clara, Calif. is employed. Ways of optimizing system performance without unduly increasing manufacturing costs are sought.

SUMMARY

In a first novel aspect, a web hosting server implements multiple virtual web servers, where each virtual web server includes web hosting software executing in a virtual machine on a host computer and a virtual Network Interface Device (NID) implemented on a signal physical NID coupled to the host computer. A virtual NID is configured by configuration information stored in an associated one of a set of smaller blocks (a second block) in a high-speed memory on the NID. For each virtual NID, there is one such smaller block that holds configuration information and status information for the virtual NID. A virtual machine on the host can configure its virtual NID by writing configuration information across the PCIe bus into a larger block (a first block) in PCIe address space, where the larger block in PCIe address space corresponds to the virtual NID to be configured. There is a one-to-one correspondence and mapping between first portions of the first larger blocks (first blocks) in PCIe memory space and first portions of the second smaller blocks (second blocks) in the NID high-speed memory space. If a virtual machine performs a PCIe write to configure its virtual NID, then circuitry on the NID detects that the address of PCIe write is into address space occupied by one of the larger blocks. If the write is into PCIe address space occupied by one of the larger blocks, then address translation circuitry on the NID performs address translation to convert the PCIe address into a smaller address that maps the write to the appropriate one of the smaller blocks associated with the virtual NID to be configured. The PCIe write of configuration information into the larger block in PCIe address space therefore results in configuring the desired virtual NID due to the configuration information being written into the correct smaller block on the NID. If, on the other hand, the address of the PCIe write request indicates that the PCIe write is not to a write into one of the larger blocks, then the NID does not perform the address translation. PCIe addresses are translated in this way both for PCIe reads from the address space of the larger blocks, as well as for PCIe writes into the address space of the larger blocks. By virtue of this address translation, general networking data flow is kept out of the high-speed NID memory and the size of the high-speed memory used to support virtual NID configuration is made to be smaller than the amount of PCIe address space consumed by the larger blocks.

In one specific example, a first part of a novel Network Interface Device (NID) detects an attempted PCIe access into the portion of the PCIe address space occupied by the larger blocks as described above. The first part of the NID sets a DAT (Do Address Translation) bit if such an attempted access is detected. In one way of accomplishing this, if the first part of the NID detects an attempted access into a portion of PCIe address space occupied by the larger blocks, and as a result the first part of the NID replaces an upper portion (for example, the upper 14-bit portion) of the PCIe address with a replacement value (a 14-bit replacement value), where one of the bits of the replacement value is the DAT bit. The DAT bit is set to indicate that address translation should then be performed by a second part of the NID. The second part of the NID then receives the address (after the replacement of the upper portion), and checks the status of the DAT bit. If the DAT bit is set and if the second part is enabled to do address translation, then the second part performs the address translation, thereby enabling virtual addressing (from the perspective of the PCIe bus) into the relatively smaller 64 KB high-speed NID memory that stores the smaller blocks. Various aspects of how the address translation is done are programmable and are set up before the PCIe attempted access occurs. Making various parameters of the address translation programmable allows the same NID hardware to be able to work with different types of operating systems executing in the virtual machines on the host, where the different types of operating systems employ different formatting of the PCIe address space allocated for NID configuration, control, and status monitoring.

It is programmable whether or not the first part of the NID sets the DAT bit if the attempted PCIe access is into the portion of PCIe address space occupied by the larger blocks (first blocks). If the DAT bit is not set then the memory that stores the second blocks is accessed without the address translation, whereas if the DAT bit is set then the memory is accessed using the address translation. The first part of the NID may be configured set the DAT bit or not depending on what kind of PCIe access it is, the purpose of the access, and/or which part of PCIe address space is being accessed. The same memory can be accessed either with or without the address translation.

In a second novel aspect, a novel Network Interface Device (NID) implements multiple virtual NIDs in a web hosting environment as described above. As described above, for each virtual NID there is a smaller block (a second block) in a memory of a transactional memory on the NID. This smaller block stores configuration information that configures the corresponding virtual NID. The NID also has a single managing processor that monitors configuration of the plurality of virtual NIDs. If there is a write into the memory space where the configuration information for the virtual NIDs is stored (into memory space occupied by the second block), then the transactional memory detects this write and in response sends an alert to the processor. The size and location of the memory space occupied by the smaller blocks (the second blocks) is programmable and is set up before a PCIe attempted reconfiguration of a virtual NID occurs.

In one specific example, a first part of the NID detects an attempted PCIe access into the portion of the PCIe address space occupied by the larger blocks (first blocks). If the first part of the NID detects an attempted access into this part of PCIe address space, then the first part replaces an upper portion of the PCIe address with a replacement value, where one of the bits of the replacement value is a GAA (Generate Alert On Action) bit. The GAA bit is set to indicate that an alert should be issued by a second part of the NID if the address is used to write into a second block. The second part of the NID then receives the address (after the replacement of the upper portion), and checks the status of the GAA bit. If the GAA bit is set and if the second part is enabled to generate alerts, then the second part monitors the access of the memory. If the access is a write of a location in a second block, then the second part sends an alert to the managing processor. The alert carries information that allows the managing processor to determine the reason the alert was generated. The alert may, for example, indicate to the managing processor that there was a write to a second block used to store configuration information for a virtual NID, and may also indicate the address of the actual memory location that was written.

In a third novel aspect, a novel transactional memory receives a command, such as a read or write command. The command as received onto the transactional memory includes an address and a novel DAT (Do Address Translation) bit. If the DAT bit is set and if the transactional memory is enabled to do address translations and if the command is for an access (read or write) of the memory of the transactional memory, then the transactional memory performs an address translation operation on the address of the command. Parameters of the address translation are programmable and are set up before the command is received on the transactional memory. In one example, the address of the incoming command includes three contiguous portions: a first portion, a second portion, and a third portion. The first portion occupies the least significant bit positions in the address of the incoming command. The address translation operation involves deleting the bits of the second portion so those bits do not appear in the translated address, and shifting down the bits of the first portion in bit position so the first portion bits occupy lower bit positions in the translated address than they did in the original address. One or more padding bits may be inserted between the third portion bits and the first portion bits in the translated address. The resulting translated address is then used to access the memory of the transactional memory when the command is carried out. If the DAT bit is not set, then the address translation is not performed and the memory of the transactional memory is accessed in normal fashion using the untranslated address of the incoming command.

In a fourth novel aspect, a novel transactional memory receives a command, such as a write command. The command as received onto the transactional memory includes an address and a novel GAA (Generate Alert On Action) bit. If the GAA bit is set and if the transactional memory is enabled to generate alerts and if the command is a write into the memory of the transactional memory, then the transactional memory outputs an alert in accordance with preconfigured parameters. Parameters for how the transactional memory should generate and send out the alert are set up beforehand by writing configuration information into the transactional memory. For example, the alert may be set up to include a value or key that the transactional memory was preprogrammed to include in the alert. The key may be used by the recipient of the alert to determine the reason for the alert being generated. The alert may, for example, be set up to include the address of the memory location in the memory that was written. The transactional memory may be set up to send the alert to a predetermined destination or recipient. In some embodiments, the alert is a write of information (information about the event that caused the alert) to a predetermined destination such as a transfer register of a processor that monitors the transactional memory. In other embodiments, the alert is an interrupt signal that is output from the transactional memory.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to background examples and some embodiments of the invention, examples of which are illustrated in the accompanying drawings.

Figure 1:
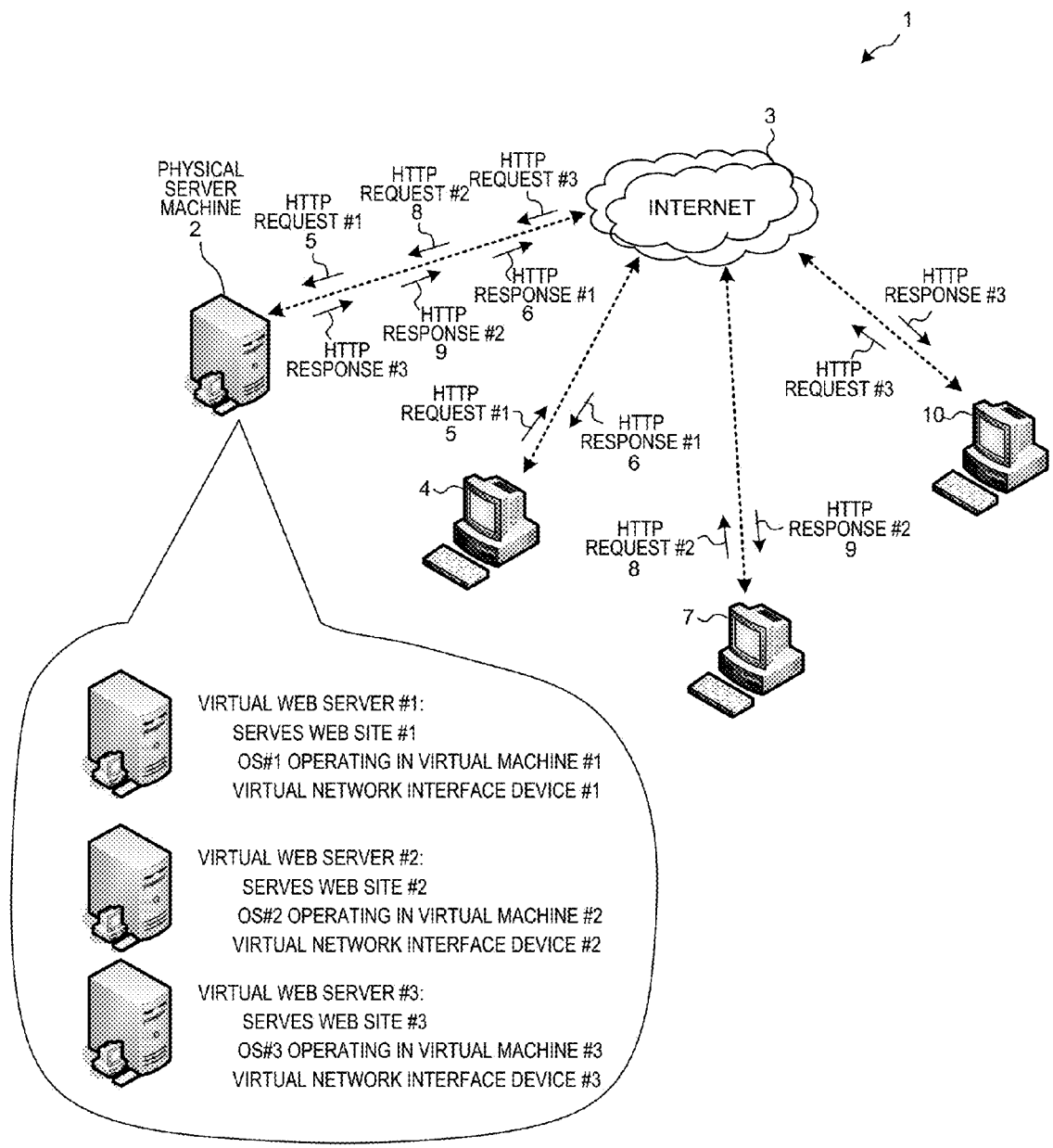
FIG. 1 is a diagram of a system involving a physical server machine 2 that implements multiple virtual web servers.

FIG. 1 is a diagram of a system 1 involving a single physical server machine 2 that is coupled to the internet 3. A web hosting service provider entity owns and operates the server machine so that the web server machine implements multiple virtual web servers. A different website can be hosted from each such virtual web server. For example, a first client customer can operate a first web site from a first of the virtual web servers, a second client customer can operate a second web site from a second of the virtual web servers, a third client customer can operate a third web site from a third of the virtual web servers, and so forth. Each such customer pays the web hosting provider entity a fee for the right to use one of the virtual servers, and then the customer uses that virtual server to host the customer's website. For each virtual server, a graphical user interface control panel function is provided and is made available across the internet. A remotely located individual client customer can use this control panel to upload files, web pages, and application layer programs to the virtual server assigned to the customer. From the perspective of the individual client customer, it is as if the client customer had use of a dedicated server machine even though in fact the same one physical server machine is providing identical web hosting services to many other individual client customers.

In the illustration of FIG. 1, a first individual on the internet uses a first internet-connected computer 4 to access the first website. The browser executing in the first computer 4 outputs an HTTP request 5 to download a webpage. This HTTP request 5 is sent from computer 4, through the internet 3, and to the server machine 2. Web hosting software executing on the first virtual server receives the HTTP request 5, and returns the requested web page in the form of an HTTP response 6. Likewise, a browser executing in a second internet-connected computer 7 can output an HTTP request 8 to download a webpage from another of the virtual web servers. The second HTTP request 8 is sent from computer 7, through the internet 3, and to the server machine 2. Web hosting software executing of the second virtual server receives the HTTP request 8, and returns the requested web page in the form of an HTTP response 9. A browser executing in third computer 10 likewise may download webpages. The web hosting software executing on one virtual server cannot interfere with, and is totally separate from, the web hosting software executing in the other virtual servers. An operator of a website can change his web hosting software and/or content so that his website performs differently, but such a change will not affect the operation of the other websites of any other of the client customers. The software of each website is operating in a different virtual machine.

In a standalone web server machine, there is typically web hosting software executing on the operating system of the machine. There is also typically a Network Interface Card (NIC card) that is attached to the computer. Any of the terms Network Interface Card (NIC), Network Interface Device (NID) and network adapter can be used to describe this device. Hereinafter the general and broad term NID will be used. NID functionality can be realized on the host computer motherboard, or can be realized in the form of a separate expansion card such as in the case of a NIC.

The NID is used by the host computer to send and receive network communications into and out of the server machine via one or more network cables. Similarly, in a virtual server there is web hosting software executing on an operating system and there is NID functionality. The web hosting software is executing in a virtual machine partition of the server. The NID functions of the virtual server are performed by a virtual NID (also referred to as a virtual adapter). A single physical NID is logically partitioned to function as multiple logically separate virtual NIDs. One such virtual NID is paired with a corresponding one of the virtual machines so that the virtual NID and the virtual machine together comprise one virtual web server.

Figure 2:
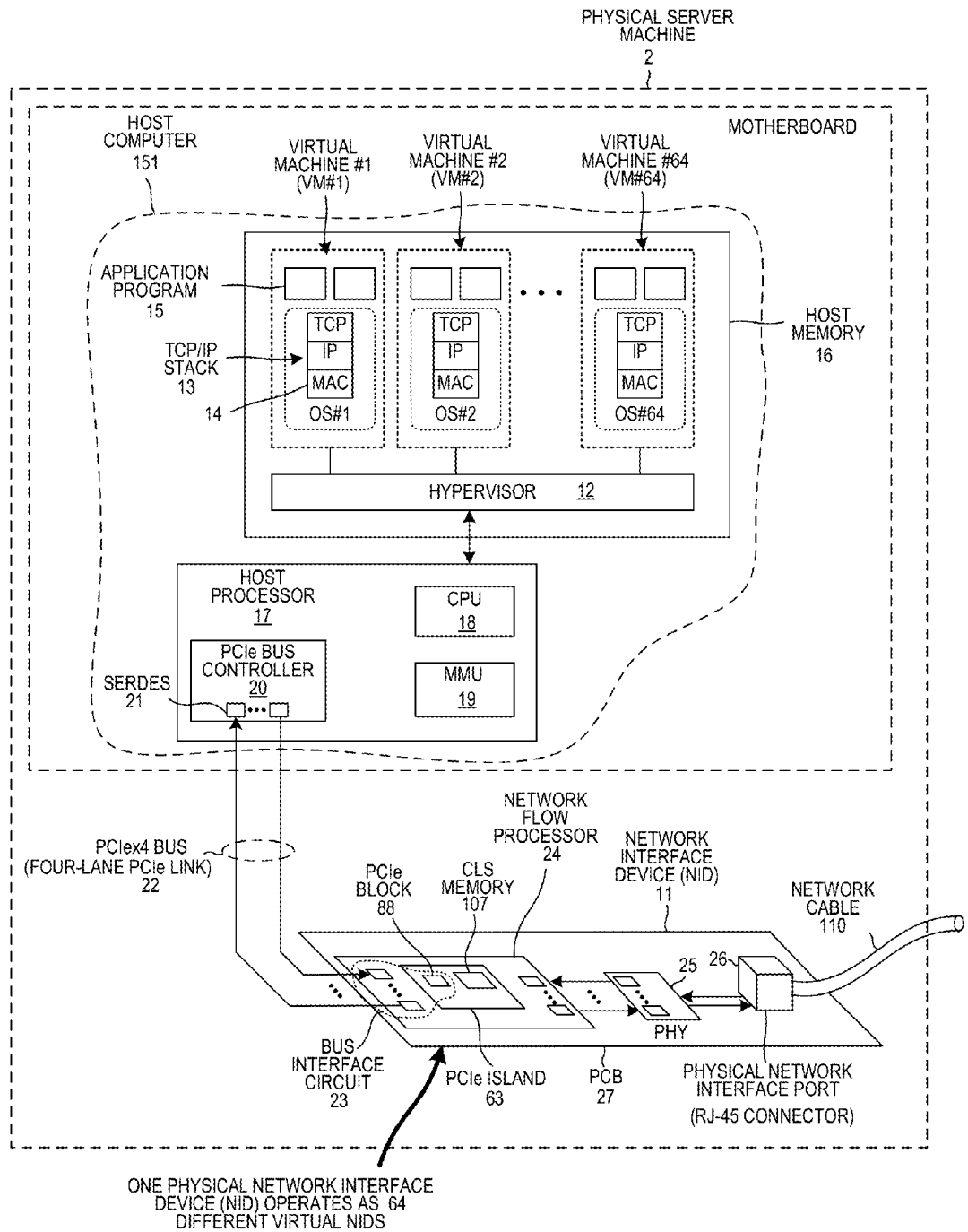
FIG. 2 is a more detailed block diagram of the physical server machine 2 of FIG. 1.

FIG. 2 is a more detailed diagram of the server machine 2 of FIG. 1. A first virtual web server comprises virtual machine VM#1 and a first virtual NID provided by physical NID 11. A second virtual web server comprises virtual machine VM#2 and a second virtual NID provided by the physical NID 11. A third virtual web server comprises virtual machine VM#3 and a third virtual NID provided by physical NID 11. As is known in the art, hypervisor firmware 12 manages the host computer 151 so that the virtual machines VM#1, VM#2 and VM#3 are separate from each other and together share the host computer's hardware resources. In the illustrated example, a separate operating system is operating in each virtual machine. Within such a virtual machine, application layer programs can use the local TCP/IP stack to engage in network communications via the appropriate virtual NID. For example, an operating system OS#1 executes in virtual machine VM#1. Reference numeral 13 identifies the TCP/IP stack. Layer 14 of the TCP/IP stack 13 is a NID device driver for interfacing with NID 11. Reference numeral 15 identifies the application layer web hosting software that handles incoming HTTP requests and that generates outgoing HTTP responses. The host computer 151 comprises the host memory 16 and the host processor 17. The host processor 17 in this case includes a CPU 18, a Memory Management Unit (MMU) 19, and a PCIe bus controller 20, among other parts not illustrated. The PCIe bus controller 20 includes multiple SerDes, one of which is identified in the diagram by reference numeral 21.

The NID 11 is coupled to the host computer 151 via a standard four-lane PCIe 3.1×4 link 22. The PCIe link 22 is compliant with the PCIe 3.1 specification as adopted and maintained by the PCI-SIG (Special Interest Group) standards body and membership group. Each of the four PCIe lanes in the example of FIG. 2 involves two pairs of electrical connections between the host computer 151 and the NID 11. Such a pair of connections is used to communicate differential signals. One such pair of connections is used to communicate differential signals into the host computer, and another pair is used to communicate differential signals out of the host computer. A bus interface circuit 23 having a set of SerDes is provided on the NID 11 as part of a novel Island-Based Network Flow Processor (IB-NFP) integrated circuit 24. In addition to the IB-NFP integrated circuit 24, the NID 11 further comprises a PHY integrated circuit 25, a physical network interface port 26, memory devices, and various other supporting circuitry. All this is provided on a supporting printed circuit board 27. The IB-NFP 24 is coupled to the PHY 25 by SerDes links as shown in FIG. 2.

Figure 3:
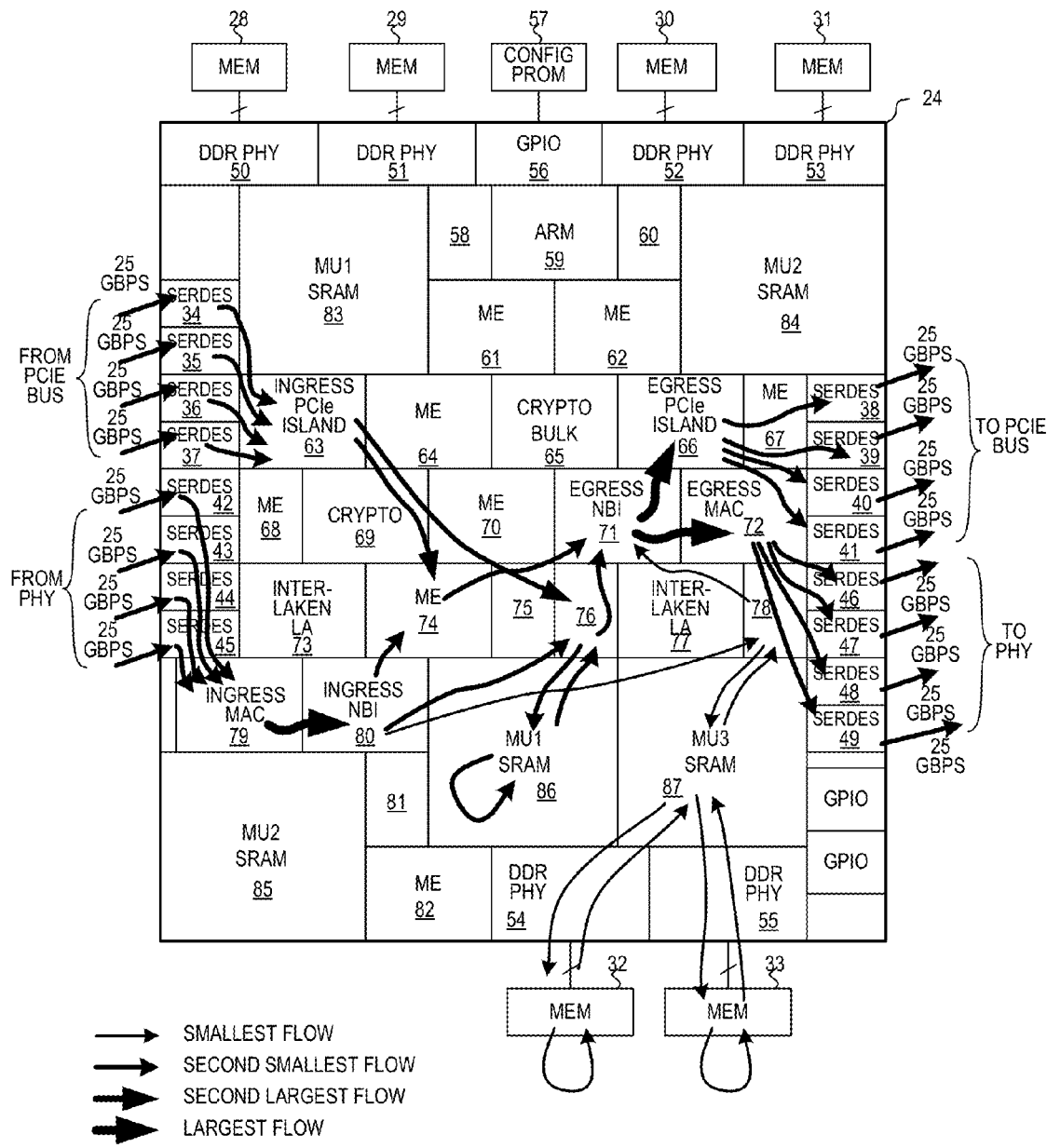
FIG. 3 is simplified top-down diagram of the Island Based Network Flow Processor (IB-NFP) integrated circuit 24 on the Network Interface Device (NID) of the physical server machine of FIG. 2.

FIG. 3 is a simplified top-down block diagram of the IB-NFP integrated circuit 24 of FIG. 2 and associated memory circuits 28-33. IB-NFP integrated circuit 24 includes many I/O (input/output) terminals (not shown). Each of these terminals couples to an associated terminal of the integrated circuit package (not shown) that houses the IB-NFP integrated circuit. The integrated circuit terminals may be flip-chip microbumps and are not illustrated. Alternatively, the integrated circuit terminals may be wire bond pads. SerDes circuits 34-41 are used to communicate with the host computer via the PCIe bus 22. SerDes circuits 42-49 are used to communicate with PHY 25. Each of these SerDes circuits can communicate packet data at a sustained rate of 25 Gbps. IB-NFP integrated circuit 24 accesses external memory integrated circuits 28-33 via corresponding 32-bit DDR physical interfaces 50-55, respectively. IB-NFP integrated circuit 24 also has several general purpose input/output (GPIO) interfaces. One of these GPIO interfaces 56 is used to access external PROM 57, so that PROM can supply a control bus CB with boot up configuration information to configure the various islands of the integrated circuit.

In addition to the area of the input/output circuits outlined above, the IB-NFP integrated circuit 24 also includes two additional areas. The first additional area is a tiling area of islands 58-82. Each of the islands is either of a full rectangular shape, or is half the size of the full rectangular shape. For example, the island 63 labeled "INGRESS PCIe ISLANS" is a full island. The island 68 below it labeled "ME" is a half island. The functional circuits in the various islands of the tiling area are interconnected by: 1) a configurable mesh Command/Push/Pull (CPP) data bus, 2) a configurable mesh control bus (CB), and 3) a configurable mesh event bus (EB). Each such mesh bus extends over the two-dimensional space of islands with a regular grid or "mesh" pattern.

In addition to this tiling area of islands 58-82, there is a second additional area of larger sized blocks 83-87. The functional circuitry of each of these blocks is not laid out to consist of islands and half-islands in the way that the circuitry of islands 58-82 is laid out. The mesh bus structures do not extend into or over any of these larger blocks. The mesh bus structures do not extend outside of island 58-82. The functional circuitry of a larger sized block may connect by direct dedicated connections to an interface island and through the interface island achieve connectivity to the mesh buses and other islands.

Figure 4:
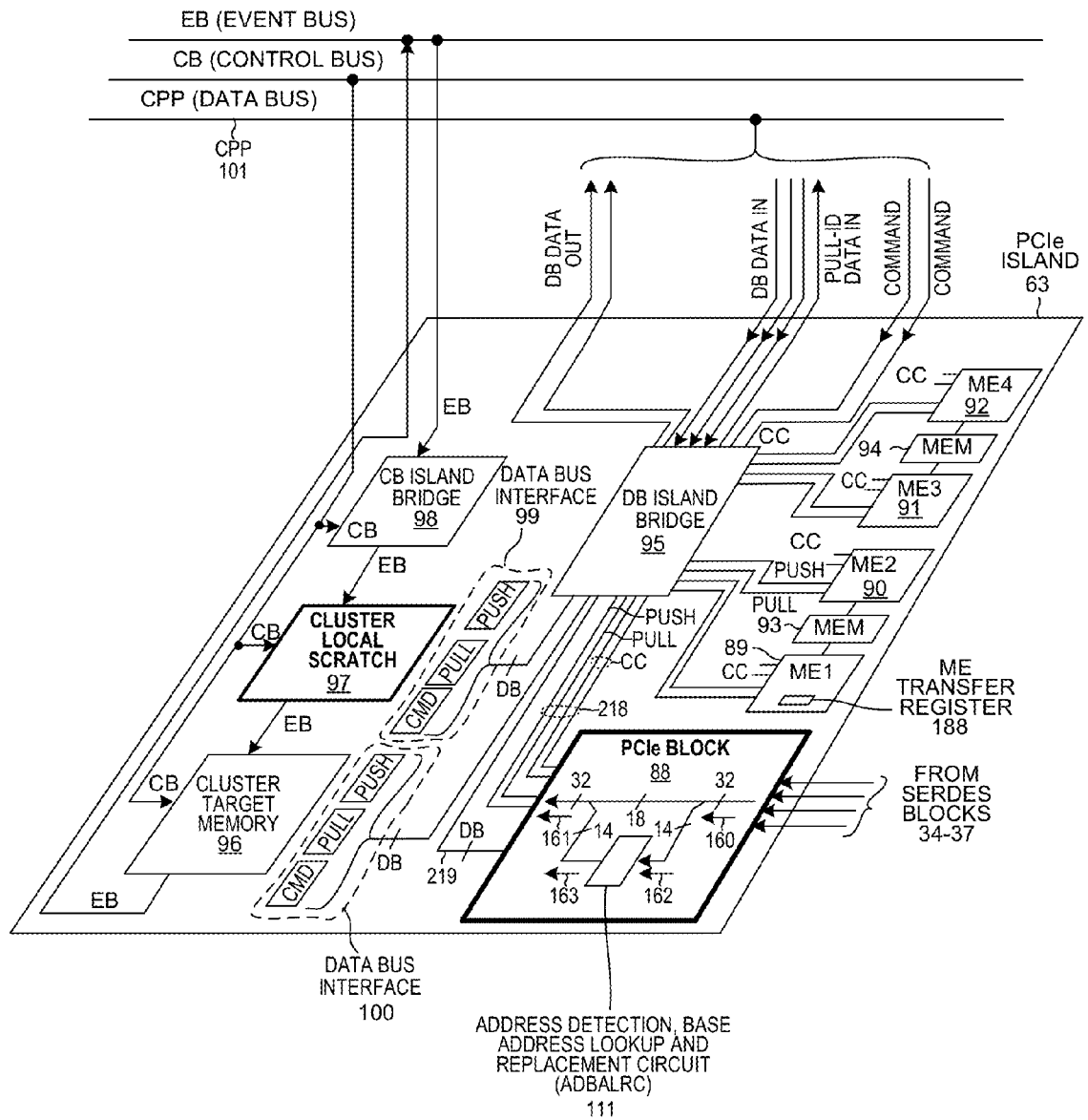
FIG. 4 is a diagram of the ingress PCIe island 63 in the network flow processor integrated circuit of FIG. 3.

FIG. 4 is a more detailed diagram of the ingress PCIe island 63 of FIG. 3. Ingress PCIe island 63 includes a PCIe block 88, four microengine (ME) processors 89-92, shared memories 93 and 94 for the processors, a data bus island bridge 95, a Cluster Target Memory 96, a transactional memory called a Cluster Local Scratch (CLS) 97, a CB island bridge 98, and data bus interfaces 99 and 100. The DB island bridge 95 is usable to engage in CPP bus transactions across the CPP data bus 101. CLS 97 is a transactional memory that can perform atomic read operations and atomic write operations. For additional information on the operation and structure of an IB-NFP and its buses, and on a CLS transactional memory, such as the transactional memory CLS 97, that can perform atomic read and write operations, see: 1) U.S. patent application Ser. No. 13/399,324, entitled "Configurable Mesh Data Bus In An Island-Based Network Flow Processor", filed Feb. 17, 2012, by Gavin J. Stark; 2) U.S. patent application Ser. No. 13/609,039, entitled "Transactional Memory That Performs An Atomic Look-Up, Add and Lock Operation", filed Sep. 10, 2012, by Gavin J. Stark et al.; and 3) U.S. patent application Ser. No. 14/151,643, entitled "Automaton Hardware Engine Employing Memory Efficient Transition Table Indexing", filed Jan. 9, 2014, by Gavin J. Stark (the entire subject matter of these three patent applications is incorporated herein by reference).

Figure 5:
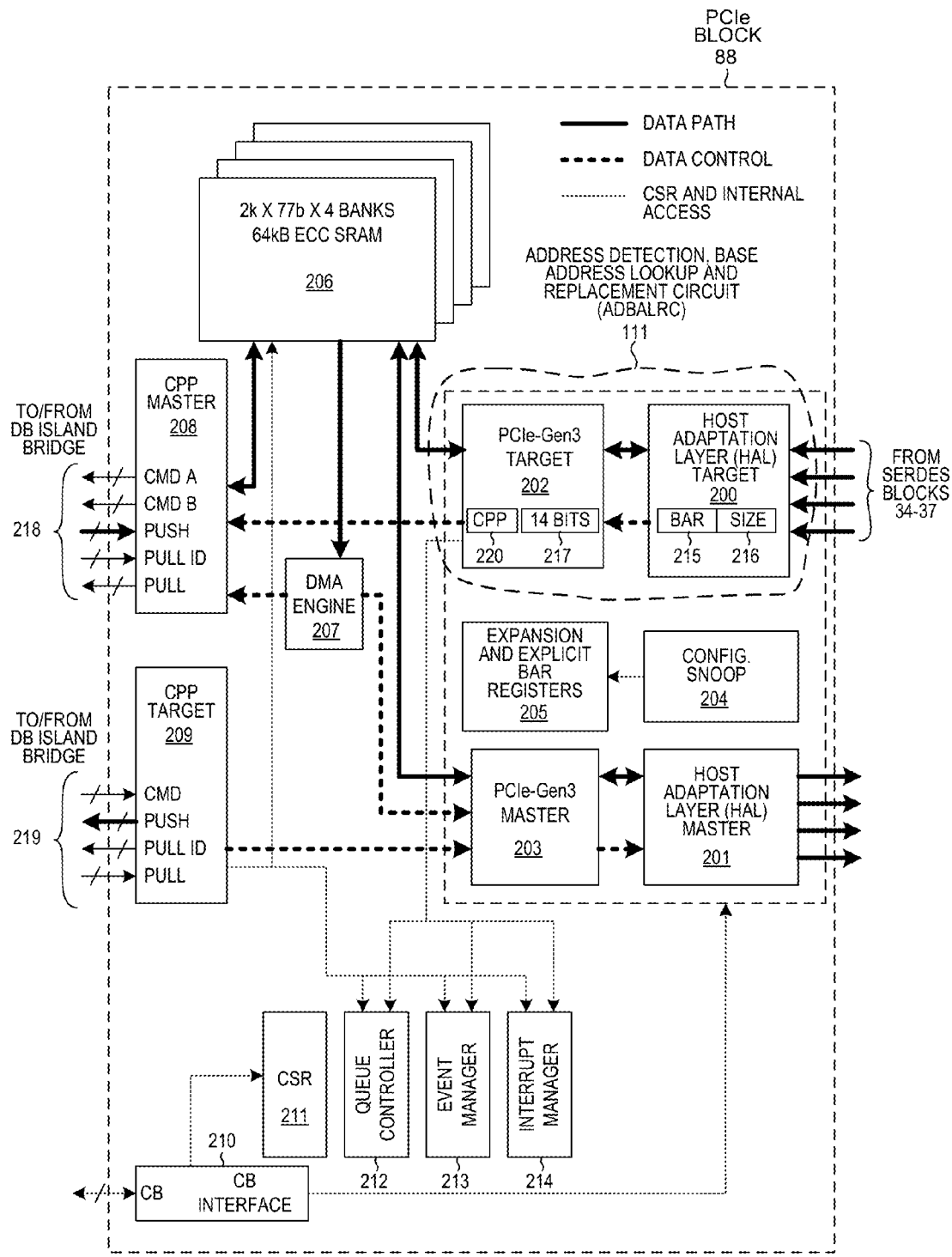
FIG. 5 is a block diagram of the PCIe block 88 within the PCIe island 63 of FIG. 4.

FIG. 5 is a more detailed diagram of the PCIe block 88 in the PCIe island 63 of FIG. 4. PCIe block 88 includes a Host Adaptation Layer (HAL) target 200, a HAL master 201, a PCIe-Gen3 target 202, a PCIe-Gen3 master 203, configuration snoop circuit 204, expansion and explicit BAR registers 205, SRAM 206, a DMA engine 207, a CPP Bus Master 208, a CPP Bus Target 209, a Control Bus interface (CB) 210, and other blocks 211-214.

Figure 6:
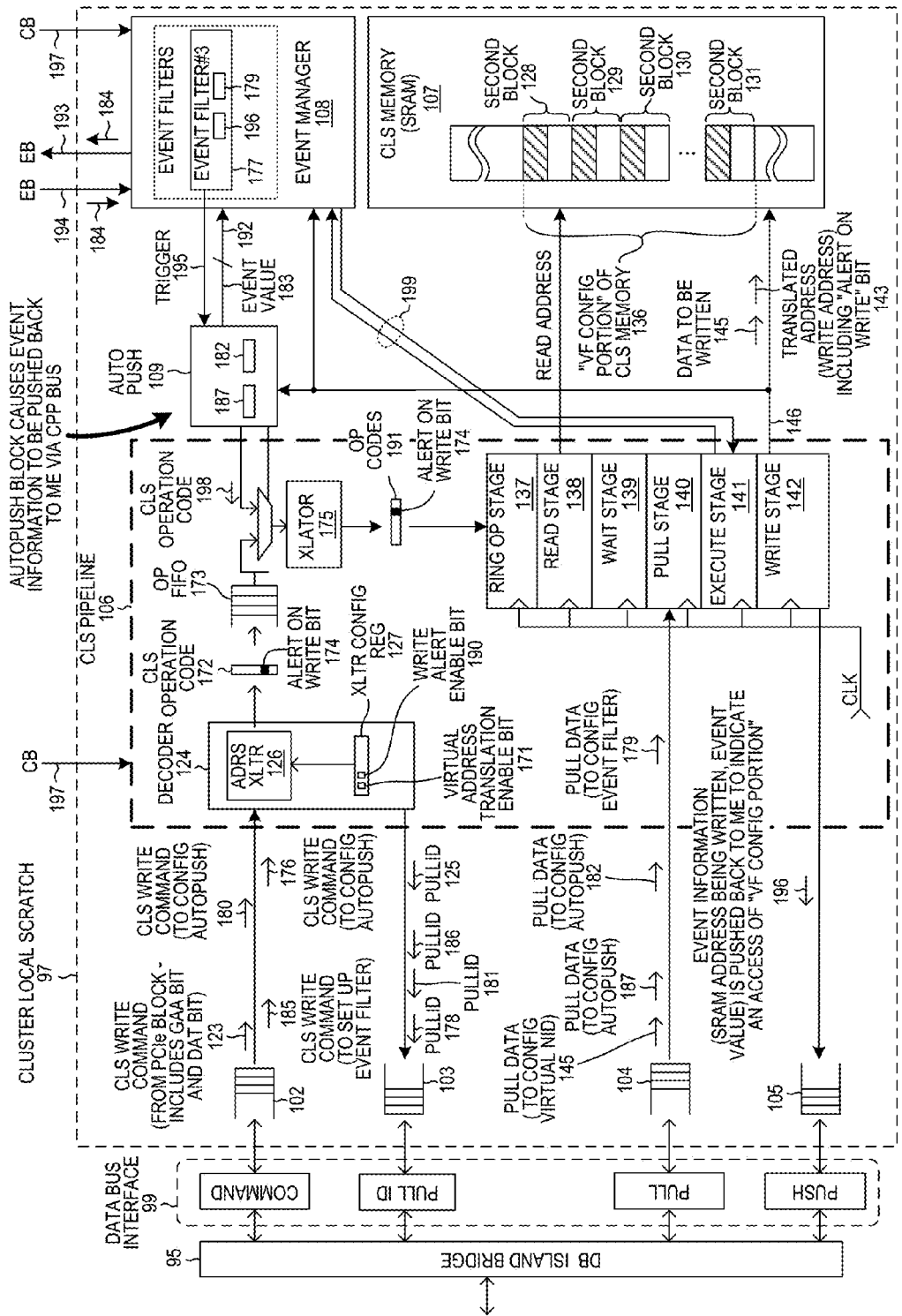
FIG. 6 is a diagram of the Cluster Local Scratch 97 (transactional memory) within the PCIe island 63 of FIG. 4.

FIG. 6 is a more detailed diagram of the Cluster Local Scratch (CLS) 97 of the PCIe island 63 of FIG. 4. CLS 97 includes interface FIFOs 102-105, a CLS pipeline 106, CLS memory 107, an event manager 108, an autopush circuit 109, as well as other circuits not illustrated. CLS memory 107 is a byte-addressed SRAM memory that is addressed using 16-bit addresses and that is 64 k bytes in size.

General Data Flow from Network, Through NID, to Host:

The general data path from the network cable 110, through the NID 11, to the web server of VM#1 is as follows. A packet is received onto the NID 11 via network cable 110 of FIG. 2. In one example, this packet is actually an ethernet frame that encapsulates an HTTP request from requesting client computer 4 (see FIG. 1) for a web page served by the virtual server involving VM#1 and the first virtual NID. The frame (hereinafter referred to as a "packet") passes into the NID 11 (see FIG. 2), passes through connector 26, through PHY 25, and to the IB-NFP integrated circuit 24. The packet passes through SerDes I/O blocks 42-45 of the IB-NFP 24 (see FIG. 3), through ingress MAC island 79, and to the ingress NBI island 80. This data path is illustrated in FIG. 3 by arrows. In one example, packet header information is passed to ME island 74, whereas data payload information is stored in a memory controlled by islands 76 and 86. The header and data payload information then pass through egress NBI island 71, through egress PCIe island 66, through SerDes I/O blocks 38-41, and across the PCIe bus 22 to the host computer 151 (see FIG. 2). The packet has the destination IP address and the MAC address of the destination VM (each VM has its own IP and MAC addresses) which in this case is VM#1, so the destination IP address and the MAC address of the packet is used to forward the packet to the correct VM. The packet is then processed up the layers of the TCP/IP stack 13 (see FIG. 2) of the VM#1. In the case of the incoming packet containing the HTTP request from requesting client computer 4, the data payload is the HTTP request and this HTTP request is presented to the application layer program 15. The application layer program 15 in this case is an HTTP server application layer program.

General Data Flow Host, Through NID, to Network:

The general data flow in the opposite direction, from the web server of VM#1, through the NID, and onto the network cable, is as follows. The HTTP server application layer 15 executing in VM#1 may, for example, send an HTTP response back to the requesting computer 4. The HTTP response is supplied as the data payload to the TCP/IP stack 13 of VM#1. The TCP/IP stack 13 in turn generates a packet (an Ethernet frame). The Ethernet frame (hereinafter referred to as a packet) is then written across the PCIe bus 22 and into the IB-NFP 24. The packet is transferred as data of a PCIe write transaction across the PCIe bus 22, through SerDes I/O blocks 34-37 and into the ingress PCIe island 63 (see FIG. 4). A novel "Address Detection, Base Address Lookup and Replacement Circuit" (ADBALRC) 111 in the ingress PCIe island 63 (see FIG. 4) examines the incoming 32-bit address of the PCIe write request. The ADBALRC 111 determines from the 32-bit address that the write is into a portion of the PCIe address space used for data communication to/from virtual adapters. In response to making this determination, the ADBALRC 111 replaces the upper 14-bit part of the incoming 32-bit PCIe address with another 14-bit value, thereby generating a 32-bit address for a CPP bus write command, where the target of the CPP bus write command is the MU interface island 76. The MU interface island 76 responds by pulling the data portion of the packet across the CPP bus from the PCIe block 88 of the PCIe island 63. The data in the pull passes from the PCIe block 88, through the DB island bridge 95 of the ingress PCIe island, across the CPP bus 101, and to the MU interface island 76.

In addition, a microengine processor (ME) in ME island 74 learns about the packet being stored in MU 76 and receives a copy of the header. To alert the ME, a second PCIe write occurs where the data payload is delivered to a queue controller 212 in the Ingress PCIe island 63. The data payload contains information about the packet as well as the packet header. The queue controller 212 in turn communicates the information and the header to the ME in ME island 74 using the push bus. Accordingly, the data payload portion of the outgoing packet (the HTTP response itself) is stored in a memory controlled by the MU island 76, whereas header portion of the outgoing packet (TCP and IP and Ethernet headers) is passed to an ME processor in ME island 74.

When the packet is to be output from the NID 11 and onto the network cable 110, ME island 74 informs egress NBI island 71 where the header portion and the payload portion can be found and provides the egress NBI island 71 with an egress packet descriptor for an outgoing packet. The egress packet descriptor indicates a queuing strategy to be used for the packet. Egress NBI island 71 uses the egress packet descriptor to read the header portion and any header modification from ME island 74 and to read the payload portion from MU island 76, 86. Egress NBI island 71 places packet descriptors for packets to be output into the correct order. For each packet that is then scheduled to be transmitted, the egress NBI island 71 uses the packet descriptor to read the header portion and any header modification and the payload portion and to assemble the packet to be transmitted. The header modification is not actually part of the egress packet descriptor, but rather it is stored with the packet header by the ME when the packet is presented to the NBI. The egress NBI island 71 then performs any indicated packet modification on the packet. The resulting modified outgoing packet then passes from egress NBI island 71 and to egress MAC island 72. Egress MAC island 72 buffers the packets, and converts them into symbols. The symbols are then delivered by conductors from egress MAC island 72 to the four SerDes I/O blocks 46-49. From SerDes I/O blocks 46-49, the 100 Gbps outgoing packet flow passes out of the IB-NFP integrated circuit 24, through PHY 25 on the NID printed circuit board, and out of the NID 11 via connector 26. The NID 11 outputs an Ethernet frame that includes the HTTP response. The HTTP response is transported across the internet back to the requesting computer 4. For additional information about the packet egress processor and related structures, see: U.S. patent application Ser. No. 13/941,484, entitled "Pipelined Egress Packet Modifier", filed Jul. 13, 2013, by Chirag Patel et al. (the entire subject matter of which is incorporated herein by reference).

Virtual NID Configuration and Control:

The description above is for general data flow out of the web server and to the network cable 110. The flow of configuration and control information from the host computer 151 and to the various virtual NIDs takes a different path.

Figure 7:
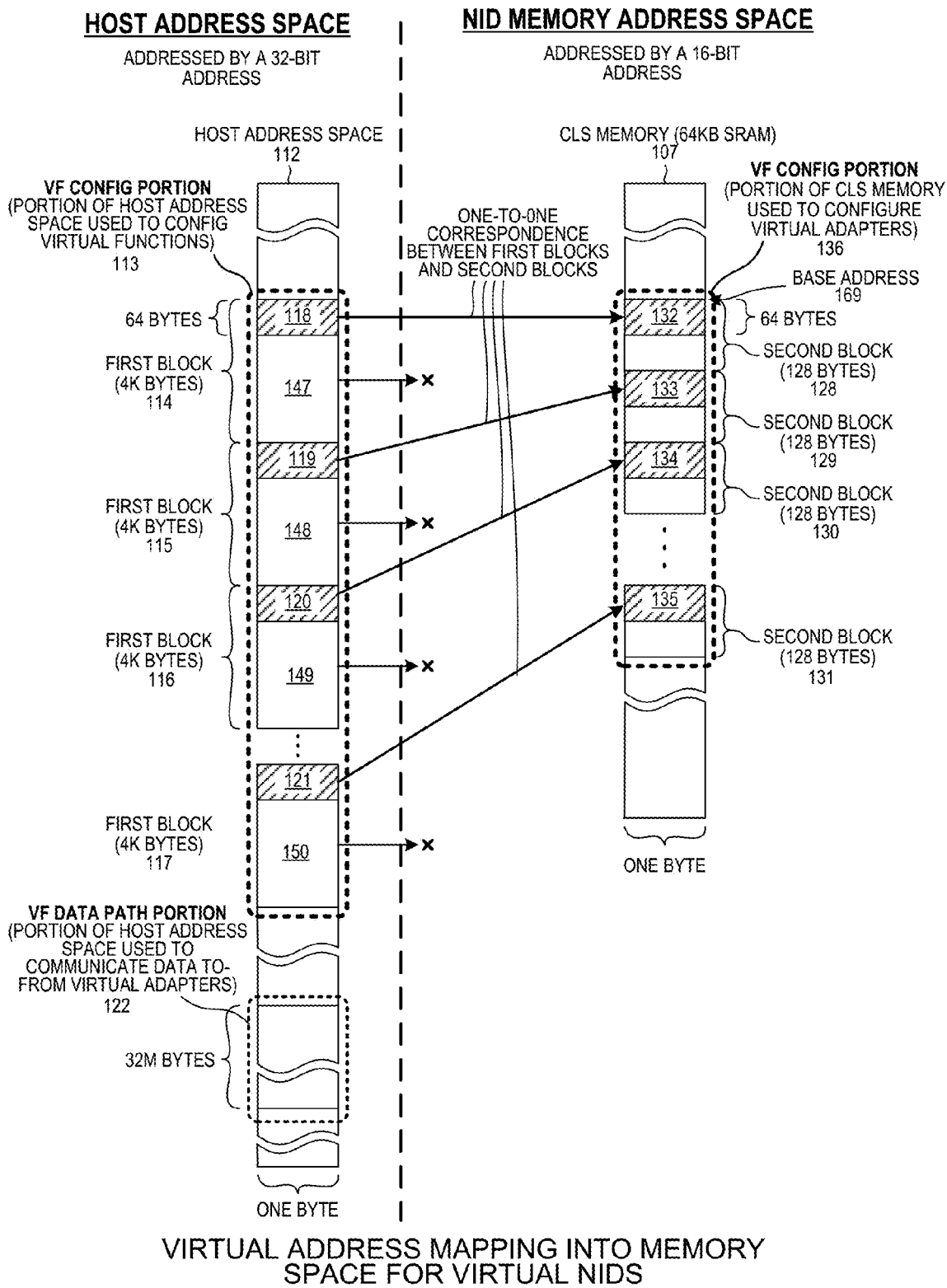
FIG. 7 is a diagram that illustrates how a part of the PCIe address space (also referred to as the Host Address Space) is mapped into the CLS memory space.

The PCIe bus uses 32-bit addresses or 64-bit addresses. In the present example, the PCIe bus uses 32-bit addresses and has a commensurately large PCIe address space 112 (see FIG. 7). The PCIe bus address space 112 is byte-addressed, so $2^{32}$ bytes of PCIe address space can be accessed across the PCIe bus. The 32-bit PCIe address space 112 is also referred to here as the "host address space". For each virtual machine, there is one corresponding 4 k-byte block of PCIe address space that is dedicated for use in configuring, control and monitoring the virtual machine. Such a 4 k-byte block is referred to here as a "first block". These 4 k-byte "first blocks" are contiguous blocks of PCIe address space. There are sixty-four such "first blocks", one for each of sixty-four possible virtual NIDs that may be provided on the NID card. The portion of the overall PCIe address space occupied by these sixty-four 4 k-byte "first blocks" is referred to as the "VF CONFIG PORTION" 113 of the host address space 112. The first 64 bytes of each such "first block" is usable to communicate configuration, control and/or status information between a virtual machine on the host and its associated virtual NID provided by the NID. Accordingly, software executing on a virtual machine on the host can configure its associated virtual NID by writing appropriate configuration information into the "first block" associated with the particular virtual NID. Examples of configuration information that can be written include instructions to turn on the virtual NID, to turn off the virtual NID, to set a bit rate line speed to be used by the virtual NID, and to assign an Ethernet address that the virtual NID will employ. The hypervisor 12 of the host computer 151 ensures that only software executing on the virtual machine using a particular virtual NID can access the "first block" of the virtual NID. FIG. 7 is a diagram that illustrates the PCIe address space 112, and the VF CONFIG PORTION 113 within it. Each 4 k-byte "first block" includes a first 64 byte portion (illustrated in hashing), and a remaining second portion. The first blocks in FIG. 7 are identified by reference numerals 114-117. The first 64-byte portions are identified by reference numerals 118-121.

In one example, NID driver software executing in VM#1 seeks to configure its virtual NID, which happens to be the first virtual NID#1. Accordingly, VM#1 causes a PCIe bus write request to be sent to the PCIe bus, where the address of the write request identifies a particular address in the first 64-byte portion 118 of the 4 k-byte "first block" 114 for the first virtual NID. The 32-bit address is received via SerDes I/O blocks 34-37 and into PCIe block 88 (see FIG. 4) of the ingress PCIe island 63. More specifically, the 32-bit address is examined by the HAL target 200. The HAL target 200 has several base address register (BAR) and size value pairs, where the BAR of each pair identifies the beginning of a region of address space and where the associated size value indicates the size of the region. One of these BAR and size value pairs (BAR 215 and size value 216) identifies the VF CONFIG PORTION 113 in PCIe address space. Another of the BAR and size value pairs identifies the VF DATA PATH PORTION 122 in PCIe address space. The HAL target uses BAR 215 and size value 216 to determine that the incoming 32-bit address is in the region of PCIe address space defined by the BAR and size value pair, and the HAL target 200 in response causes the PCIe-Gen3 target block 202 to replace the upper 14-bit part of the incoming 32-bit PCIe address with another 14-bit value 217. The 14-bit value 217 for replacement and an associated 4-bit CPP target value 220 was stored beforehand in the PCIe-Gen3 target. For each BAR/size pair, the PCIe-Gen3 target 203 stores one such 14-bit replacement value and an associated 4-bit CPP target value. The 14-bit values and 4-bit CPP target values are written into the PCIe-Gen3 target 202 via the CB bus 197.

The resulting 32-bit address (after the 14-bit replacement) is then used by PCIe block 88 to output a CPP bus write command via CPP master 208, where the CPP bus write command is to write the configuration data in a CPP bus transaction across lines 218 and through DB island bridge 95, and into CLS memory 107. The 4-bit CPP target value 220 is used in the CPP bus write command to set to target of the bus transaction to be the CLS memory in CLS 97. (In FIG. 4, the CPP target 209 in the PCIe block 88 is also coupled to the DB island bridge 95 via lines 219.) It is the replaced upper 14-bit part of the 32-bit address of the CPP bus transaction that results in the CPP bus write command going to the CLS 97, as opposed to another part of the IB-NFP. As described above, if the PCIe block 88 had detected that the 32-bit PCIe address had been in the "VF DATA PATH PORTION" 122 of PCIe address space (see FIG. 7) used for data communication with virtual NIDs, then the PCIe block 88 would have replaced the first 14-bit part of the address so that the resulting address would have been forwarded through the DB island bridge 95 and CPP bus to the MU island 76, 86. In the present example of configuring a virtual NID, however, the original PCIe address 160 is in the "VF CONFIG PORTION" 113 of PCIe address space 112 so the PCIe block 88 makes the 14-bit replacement so that the resulting address 161 (see FIG. 8) will be forwarded to the CLS 97 as the address of a CPP bus write command 123. The CPP bus write command is illustrated in FIG. 6.

The CLS 97 receives the CPP bus write command 123 into its command FIFO 102. The CPP bus write command 123 passes through the command FIFO 102 and into the CLS pipeline 106. The decoder 124 of the CLS pipeline 106 interprets the CPP bus write command 123 as a CLS command, and in response generates a pull-id 125 to retrieve the data to be written from the CPP master 208 in the PCIe block 88. The pull-id 125 is sent back across the CPP bus to the PCIe block 88 as part of the overall CPP bus transaction. In response to receiving the pull-id 125, the CPP master 208 of the PCIe block 88 sends the pull data (the configuration data to be written into the CLS memory) across the CPP bus through DB island bridge 95 to the CLS 97, and into interface FIFO 104.

In accordance with one novel aspect, the decoder 124 block of the CLS pipeline not only generates the pull-id 125, but the decoder 124 also includes a novel address translation circuit 126 (ADRS XTLR) and an associated translation configuration register 127 (XTLR CONFIG REG). Only if a particular "Do Address Translation" (DAT) bit 170 in the upper fourteen bits of the address of the CLS write command 123 is set and if a special "Virtual Address Translation Enable" bit 171 stored in the configuration register 127 is set, then does the address translation circuit 126 perform a novel address translation operation, whereas if either the DAT bit 170 is not set or if the "Virtual Address Translation Enable" bit 171 is not set then the special address translation does not occur. The DAT bit 170, which was provided by the PCIe block of the PCIe island as one of the bits of the replacement upper 14-bits of the address, however, is set in the present example of a PCIe write into "VF CONFIG PORTION" 113. Moreover, in this example, the "Virtual Address Translation Enable Bit" 171 of configuration register 127 is also set.

The configuration register 127 can be loaded either via the control bus CB 197, or by an ME that writes configuration data across the CPP bus and into the configuration register 127 via the CLS pipeline.

Because in this example both the DAT bit 170 and the "Virtual Address Translation Enable Bit" 171 are set, the address translation circuit 126 performs the novel address translation as described in further detail below so that the address of the CLS write command points to a byte in the first 64 bytes 132 of the "second block" 128 in CLS memory 107 corresponding to the first virtual NID. As explained in further detail below, the CLS memory 107 has a "second block" for each of the virtual NIDs, but each such "second block" is only 128 bytes in size. There is a one-to-one correspondence between the sixty-four "first blocks" in PCIe address space (that are each 4 k bytes in size), and the sixty-four "second blocks" in CLS memory (that are each 128 bytes in size). The first 64 bytes of each "first block" are mapped, due to the address translation, to the first 64 bytes of each "second block".

The decoder 124 interprets the CPP bus command as a CLS command and outputs a CLS operation code 172. As shown in FIG. 6, the CLS operation code 172 is passed to the OP FIFO 173. If the DAT bit 170 is set and the "Virtual Address Translation Enable Bit" 171 stored in the configuration register 127 is set (as it is in this example), then an "Alert On Write" bit 174 in this CLS operation code 172 is set. If either the DAT bit 170 is not set or if virtual address translation bit 171 is not set, then the "Alert On Write" bit 172 in the CLS operation code 172 would not be set. The CLS operation code 172 passes through the OP FIFO 173 and is converted by translator 175 into a set of op codes, where there is one op code for each of the stages 137-142 of the pipeline. The op codes are processed down the stages 137-142 of the CLS pipeline. The write stage 142 supplies to the CLS memory 107: 1) the translated address (16-bits) 143 which is used as the write address, 2) the "Alert On Write" bit, and 3) the configuration data 145 to be written via conductors 146. The autopush block 109 monitors this write into memory 107 and detects that the "Alert On Write" bit 174 is set as explained in further detail below. By virtue of the configuration data being written into the correct byte of the first 64 bytes 132 of the "second block" 128 associated with the first virtual NID, the first virtual NID is configured as desired by VM#1. Depending on the configuration data written and the particular byte into which the configuration data is written, the first virtual NID may for example be turned on, or may be turned off, or an Ethernet address for the NID may be assigned, or the line speed of the virtual NID may be set.

Although in the example described above the software executing in VM#1 caused a PCIe write of configuration information, in another example the software in VM#1 can cause a PCIe read of status information from its virtual NID. NID circuitry places status information into particular bytes of the first 64 bytes of the "second block" by the virtual NID, so that virtual machine software can then read that status information across the PCIe bus and determine the status of the virtual NID. Regardless of whether the VF CONFIG PORTION 136 of the CLS memory 107 is being read or written, the PCIe block 88 and the address translation circuit 126 function together as the bus interface circuit 23 (see FIG. 2) that performs the novel address translation so that the "first blocks" 114-117 in PCIe address space 112 are mapped to the "second blocks" 128-131 in CLS memory 107 in a proper one-to-one correspondence.

FIG. 7 illustrates the mapping between the PCIe address space 112 and the CLS memory 107 in further detail. The first 64 byte portion 118 of first block 114 is mapped to the first 64 byte portion 132 of second block 128, the first 64 byte portion 119 of first block 115 is mapped to the first 64 byte portion 133 of second block 129, the first 64 byte portion 120 of first block 116 is mapped to the first 64 byte portion 134 of second block 130, and so forth. The second portions 147-150 of the first blocks are not mapped into the CLS memory space. PCIe address space 112 is byte-addressed. CLS memory 107 is also byte-addressed. Unlike the VF CONFIG PORTION 113 of PCIe address space 112, the "VF DATA PATH PORTION" 122 of the PCIe address space 112 used for data communication to/from virtual NIDs is not mapped into the CLS memory 107 but rather it is mapped to MU island 76, 86. In one advantageous aspect, data flow is kept out of the high-speed CLS memory 107.

Address translation by (ADRS XTLR) 126 is performed when accesses are made into the VF CONFIG PORTION 136 of the CLS memory 107, but no address translation is performed when accesses are made into the other parts of the CLS memory 107. Accesses into CLS memory 107 can originate from the PCIe bus as PCIe write requests, and other accesses into CLS memory 107 can originate from other parts of the IB-NFP 24. In both cases, the transactional memory CLS 97 receives transactional memory commands with the DAT bit 170 being either set or cleared, and it is the status of this DAT bit 170 that determines whether the novel address translation will be used in the memory access.

Figure 8:
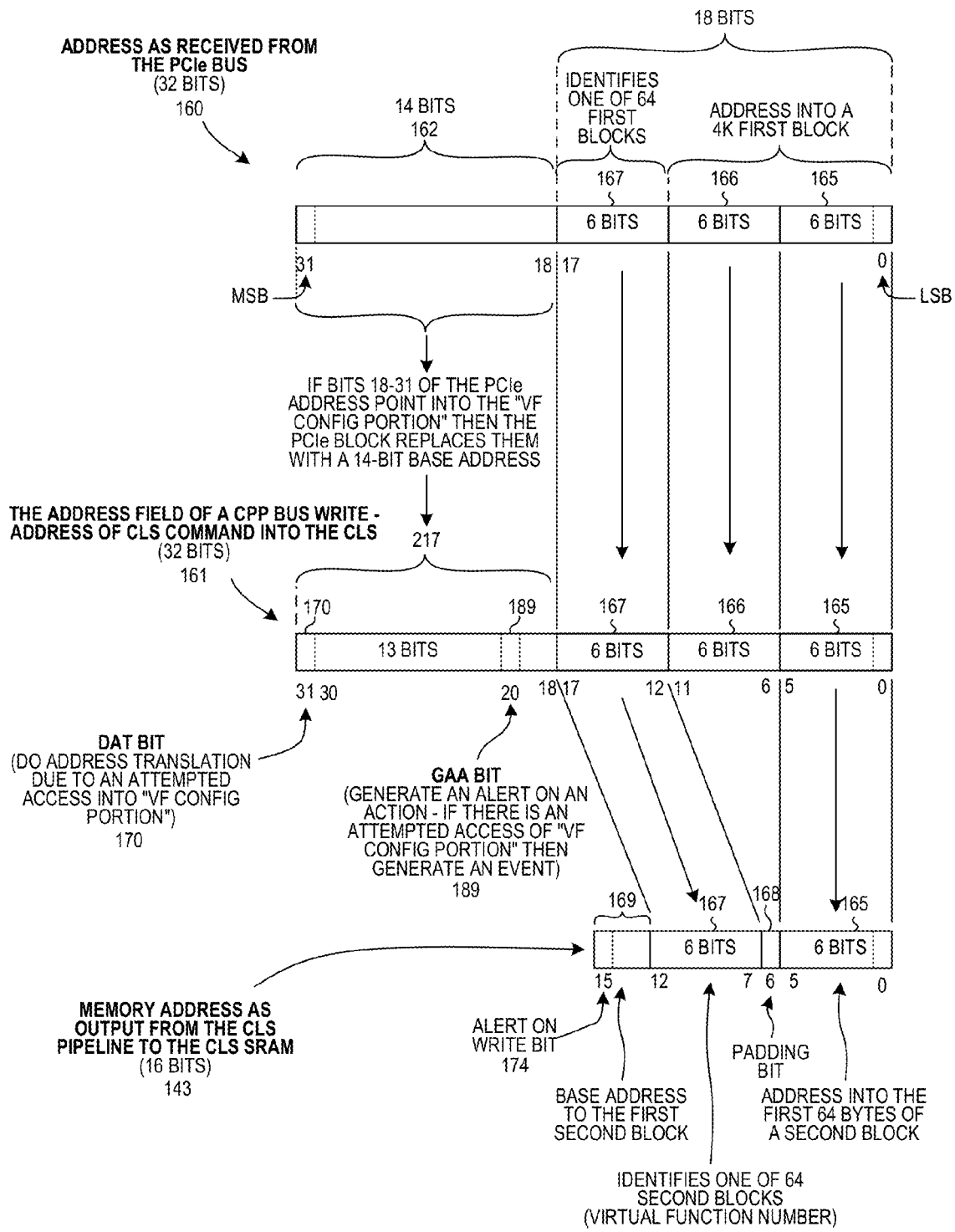
FIG. 8 is a diagram that illustrates how a first address (32-bit bits) in PCIe address space is translated into a second address (16-bits) in CLS memory space.

FIG. 8 illustrates the novel address translation in further detail. Reference numeral 160 identifies the address as received from the PCIe bus onto the PCIe island 63. Reference numeral 161 identifies the address after the PCIe block 88 has replaced the upper fourteen bits as appropriate. As described above, the PCIe block 88 examines the PCIe address 160 of the PCIe bus request and if the PCIe address points into the "VF CONFIG PORTION" 113 (see FIG. 7) then the PCIe block 88 replaces the upper fourteen bits 162 with the first 14-bit value 217. The PCIe block generates a CPP bus write command (part of which is interpreted as a CLS write command) where the address of the CPP write command causes the target to be the CLS. After the target CLS pulls the configuration data to be written, the CLS pipeline writes the pulled configuration data into the appropriate "second block" in CLS memory as determined by the translated 16-bit address 143. If, however, the PCIe address 160 points into the "VF DATA PATH PORTION" 122 (see FIG. 7) then the PCIe block 88 replaces the upper fourteen bits 162 with a second 14-bit bit value so that when the resulting address is used in a CPP bus write to the MU island. In FIG. 8, reference numeral 143 identifies the address after the address translation circuit 126 in the CLS 106 has performed the novel address translation. Only if the DAT bit 170 is set, and only if the "Virtual Address Translation Enable" bit 171 in the configuration register 127 is set, does the special address translation occur. The 32-bit address 161 as received by the decoder 124 in the CLS 106 includes a first portion 165, a second portion 166, a third portion 167, and the 14-bit portion 217. The translation involves deleting the second portion 166 such that the second portion does not appear in the resulting 16-bit address 143, and involves shifting down the third portion 167 in bit position. A padding bit 168 is inserted. Base address bits 169 are appended as illustrated in FIG. 8. These base address bits 169 set the beginning of the VF CONFIG PORTION 136 to start at a particular desired memory location in CLS memory 107. The CLS pipeline uses the resulting 16-bit address 143 to write the pulled configuration data into the CLS memory 107.

Figure 9:
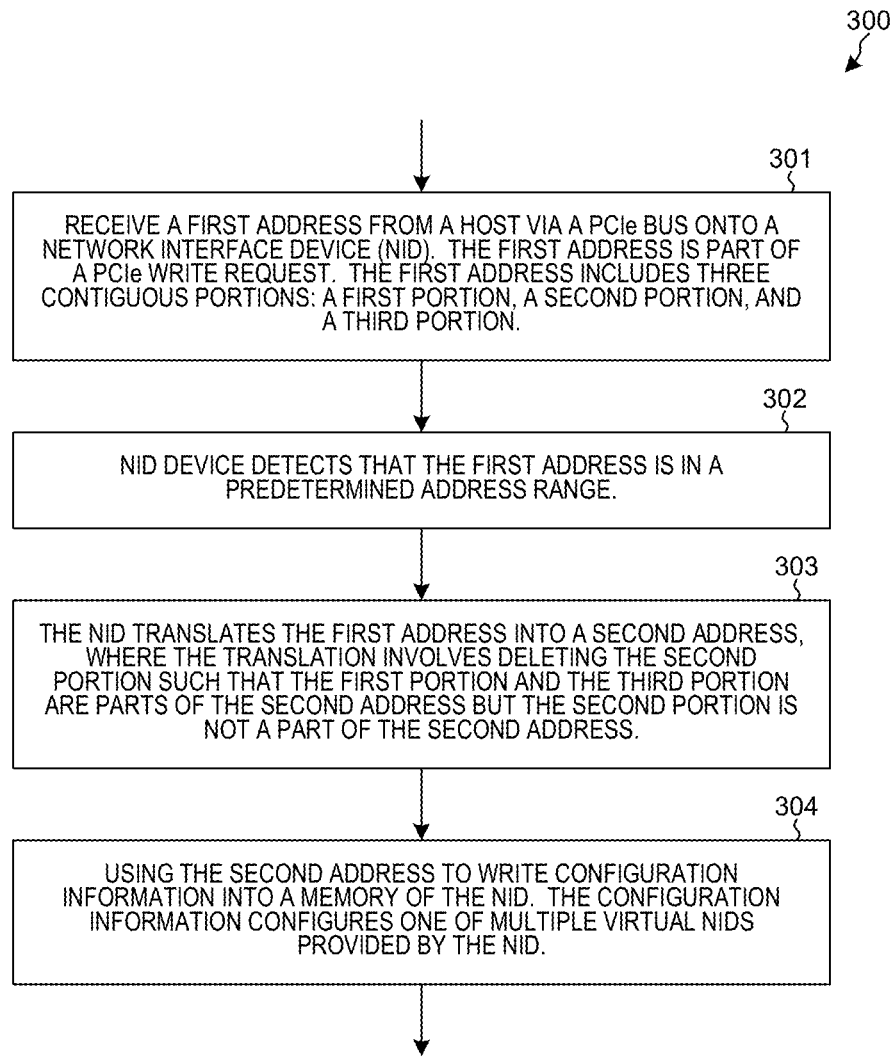
FIG. 9 is a flowchart of a method in accordance with one novel aspect.

FIG. 9 is a flowchart that illustrates a method 300 in accordance with one novel aspect. The NID receives (step 301) a 32-bit address 160 (first address) as part of a PCIe write request. The first address indicates that the write is into the VF CONFIG PORTION 113 of the 32-bit address space used for virtual functions. The first address 160 includes three contiguous portions: 1) a first portion 165, 2) a second portion 166, and 3) a third portion 167. FIG. 8 shows the three portions in one example. The 6-bit value of the third portion 167 points to one of the sixty-four "first blocks". The 6-bit value of the first portion 165 points to one location in each 64 byte portion of the first block. (One 4 k byte block of PCIe address space actually comprises a 64 sixty-four byte portions, where the first sixty-four byte portion is the portion used to communicate configuration and status information.) The 6-bit value of the second portion 166 points to one of the several 64 byte portions of the 4 k byte first block. Together the first, second and third portions point to a single address location in one of the "first blocks".

Next, the NID detects (step 302) that the first address 160 is in the address range of the "VF CONFIG PORTION" 113. If the first address is not detected to be in this address range in this step, then no special address mapping into CLS memory space is performed. As a result of the first address 160 being detected to be in the VF CONFIG PORTION 113, the NID translates (step 303) the 32-bit first address 160 into a 16-bit second address 143, where the second address 143 is a memory address for the high-speed CLS memory 107 located in the PCIe island. The translation involves deleting the second portion 166 such that the first portion 165 and the third portion 167 are parts of the second address 143, but such that the second portion 166 is not a portion of the second address 143. As shown in FIG. 8, a padding bit 168 is inserted between the shifted-down first portion and the third portion. Three bits of base address 169 are appended as shown in FIG. 8 to make the resulting 16-bit second address 143. The second address 143 is then used (step 204) to write the configuration data of the PCIe write bus transaction into the appropriate "second block" in the high-speed CLS memory of the NID. The configuration data that is written causes one of the multiple virtual NIDs to be configured in a desired manner.

The translation of FIG. 8 involves shifting a certain number bits of the third portion by a certain amount, and involves first, second, and third portions of particular sizes, and involves adding a certain number of padding bits. These specifics are just presented in FIG. 8 in order to illustrate one particular example of how the address translation may be done. The particulars of the address translation are, however, programmable. In one particular embodiment, how the address translation is done is programmable and is determined by values written into the address translation configuration register 127. Address translation circuit 126 may be realized by describing the function of the circuit in a hardware description language, including which parameters of the translation are programmable by values stored in register 127, and then using commercially available hardware synthesis software tools to generate digital logic circuitry that can perform the specified address translation function.

Figure 10:
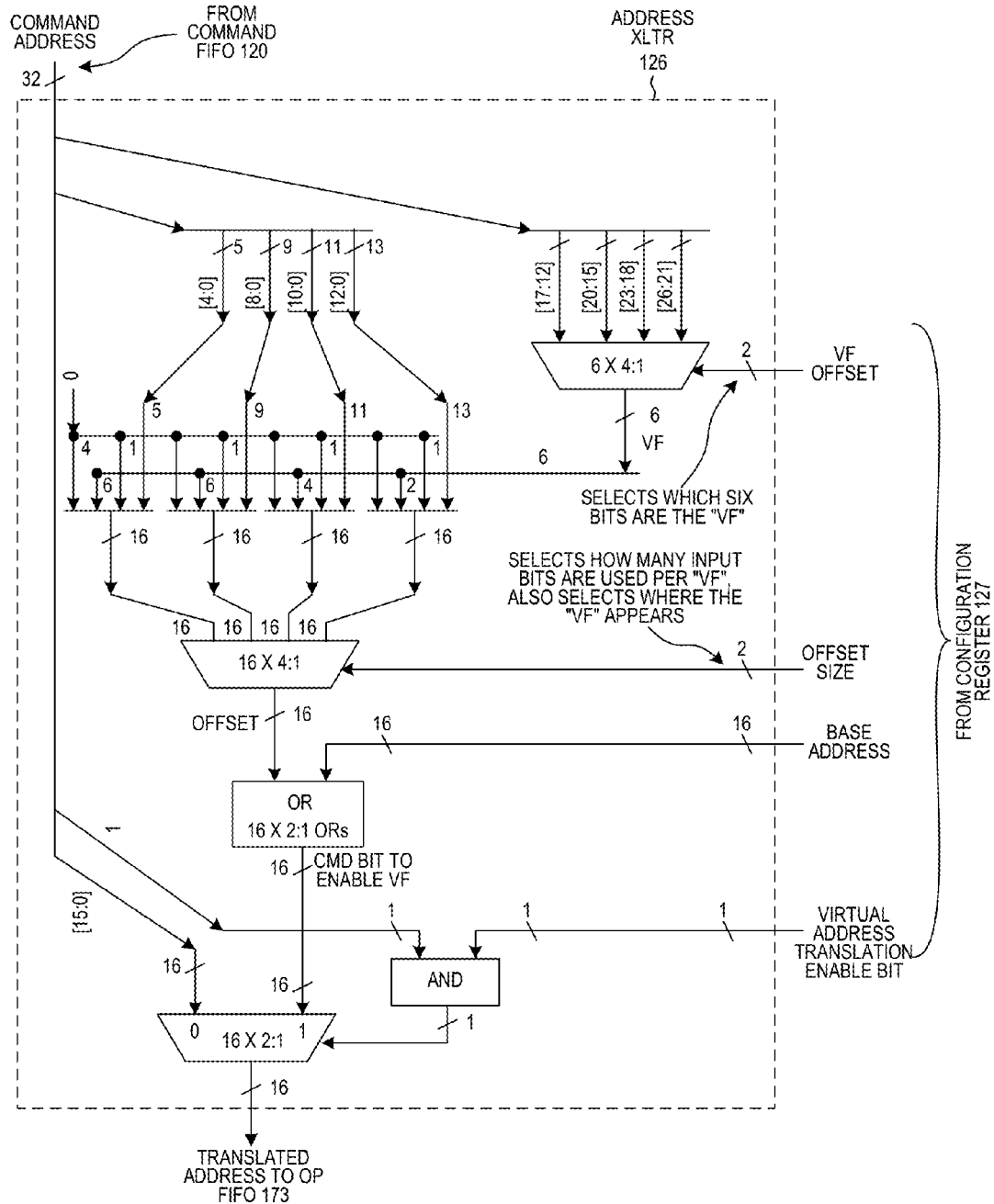
FIG. 10 is a block diagram of the address translation circuit 126 in the decoder block 124 of the CLS pipeline 106 of the CLS 97 of FIG. 6.

FIG. 10 is a more detailed block diagram of one specific embodiment of the address translation circuit 126 in the decoder 124 of the CLS pipeline 106 of the CLS 97 of FIG. 6. In this specific embodiment, the following parameters of the address translation are programmable: 1) Virtual Address Translation Enable Bit—if this bit is cleared, do not ever do translation; 2) VF Offset—these bits identify the starting bit in the incoming CPP address where the 6-bit VF value is found; 3) Base Address—this 16-bit base address is ORed with the determined address to generate the translated address to be used to access the CLS memory 107—i.e., this is the base address of the region in CLS memory 107 for the second blocks; 4) Offset Size—these bits determine how many bottom bits of the incoming CPP address are used in the translated address (the size of the third portion 167). It is the particular NID drivers of the operating systems executing in the virtual machines on the host that determine how big the "first blocks" are, how many "first blocks" there are, and how many bytes at the beginning of each such field block are used to communicate configuration data, and other details of the VF CONFIG PORTION. The programmability of the address translation circuit 126 allows the NID 11 to be usable with different types of operating systems that employ different NID drivers and use different VF CONFIG PORTION formatting. In a given web server, the operating systems executing in the virtual machines must be of the same type but the NID 11 is flexible enough to be able to work with whatever operating system type is chosen.

Although the first "first block" is shown in FIG. 7 being mapped to the first "second block", and the second "first block" is shown being mapped to the second "second block", and the third "first block" is shown being mapped to the third "second block", and so forth, this need not be the relationship between the first and second blocks. There is a one-to-one correspondence between first blocks and second blocks, but a first block can be paired with any particular second block as long as the required one-to-one correspondence is maintained. In one example, which one of the virtual NIDs it is that is paired with a particular virtual machine on the host is determined dynamically at run time during NID operation. As the web server runs, various virtual machines on the host start up and shut down a various times, and associated virtual NIDs may be used or may be unused. At the time that a virtual machine is started up and requests use of a virtual NID, the particular virtual NID that the hypervisor assigns will depend on which virtual NIDs are unused at that time. Once a virtual NID has been assigned to a particular virtual machine, then the virtual NID cannot be used by another other virtual machine. The PCIe address space to NID memory space translation described above is performed to support this dynamic mapping. Accordingly, each of the sixty-four values indicated by 6-bit field 167 in the first address 160 of FIG. 8 (that identifies a particular "first block") is made to map to one and only one of the sixty-four values indicated by 6-bit field 167 in the second address 143 of FIG. 8 (that identifies a particular "second block"). A LUT (not shown) is provided in the PCIe-Gen3 target 202 in order to provide the translation of the value of the 6-bit field 167 of the first address 160 into the 6-bit field 167 in the second address 143.

Generate Alert if NID Configuration is Changed:

In the example above, the CLS transactional memory 97 was sent a CLS command to write configuration data into a particular part of its CLS memory 107, thereby causing a change in the configuration of a particular virtual NID. In one example, a particular ME 89 (see FIG. 4) is assigned to monitor the configuration of the virtual NIDs. The CLS transactional memory 97 can be set up so that if there is a write to the VF CONFIG PORTION 136 of the CLS memory space (see FIG. 7) then the CLS transactional memory 97 will automatically alert the ME 89 of this occurrence. The description below explains the setup and use of this alert mechanism.

Prior to the sending of the CPP command that resulted in the writing of the configuration information into the CLS memory, the ME 89 issues three CPP commands to set up the autopush block 109 and the event manager 108 of the CLS 97. The first CPP command is a CPP write command to write configuration information to the event manager 108, thereby setting up event filter #3. The first CPP command passes within the PCIe island 63 of FIG. 4 from the ME 89, through the DB island bridge 95, and through the DB interface 99, and into command FIFO 102 of the CLS 97. The resulting CLS command is indicated in FIG. 6 by reference numeral 176. This CLS command 176 is to write configuration information, where the address to be written to indicates event filter #3 177 in the event manager 108. The decoder 124 interprets the CLS command 176, and issues a PULL-ID 178 to pull configuration data from the ME. The configuration data 179 is returned via PULL FIFO 104. The CLS pipeline then writes the configuration data 179 into event filter #3 177. This configuration data 179 sets up the third event filter 177 to look for event packets on the event bus EB that are of type "write alert" and that have a source of "CLS in island 63". For additional information on event managers and event filters and how an event manager can be set up to inject an event packet onto the event bus, as well as on general operation and structure of an IB-NFP, see: 1) U.S. patent application Ser. No. 13/399,983, entitled "Global Event Chain In An Island-Based Network Flow Processor", filed Feb. 17, 2012, by Gavin J. Stark et al.; 2) U.S. patent application Ser. No. 13/400,008, entitled "Flow Control Using A Local Event Ring In An Island-Based Network Flow Processor", filed Feb. 17, 2012, by Gavin J. Stark et al.; and 3) U.S. patent application Ser. No. 14/151,643, entitled "Automaton Hardware Engine Employing Memory Efficient Transition Table Indexing", filed Jan. 9, 2014, by Gavin J. Stark et al. (the entire subject matter of these three patent applications is incorporated herein by reference).

Next, the ME 89 issues a second CPP command to write configuration information to the autopush block 109, thereby setting up the autopush 109 to take a particular action if the autopush block 109 detects a write into the CLS memory when the "Alert On Write" bit 174 set. The resulting CLS command 180 passes into the CLS pipeline, and the decoder 124 generates a PULL ID 181 to pull the configuration information from the ME. The configuration information 182 is returned via PULL FIFO 104, and is written by the CLS pipeline into the autopush block 109. This configuration information 182 will cause the autopush block 109 to send an event value 183 to the event manager 108 if an alert-on-write occurs, where the event value 183 that is then sent to the event manager is a key that the ME 89 has set up before hand to identify an alert. In the future, upon receiving the event value 183 from the autopush block 109, the event manager 108 will then generate an event packet 184, where the event packet 184 has: 1) a type field of "write alert", 2) a source of event field of "CLS in island 63", and 3) a data field that carries both the "event value" and the "SRAM address being written".

Next, the ME issues a third CPP command to write configuration information to the autopush block 109, thereby setting up the autopush block 109 to take a particular action if it receives a trigger signal 195 from the third event filter 177. The autopush block 109 receives a single bit trigger signal from each of the event filters of the event manager. The third CPP command is received by the data bus interface 99, and results in a CLS command 185 to write configuration information 187 into the autopush block 109. The decoder 124 receives CLS command 185 and in response generates a PULL ID 186 to pull the configuration data from the ME. The ME returns the configuration data 187 which passes into the CLS via PULL FIFO 104. The CLS pipeline writes the configuration information 187 into the autopush block 109. Configuration information 187 configures the autopush block 109 to inject a CLS operation code 198 into the CLS pipeline 106 in response to the autopush block 109 receiving a trigger signal 195 from the third event filter 177. The CLS operation code 198 to be injected is to use the pipeline stages 137-142 to read event information from event filter #3 177, and to cause the pipeline stages 137-142 to push the event information back across the CPP bus and into a particular transfer register 188 in the particular ME 89. For additional information on how an event manager can be made to inject an event packet onto the event bus, and on how an event filter can then detect the event packet and trigger an autopush block to inject an operation code into a CLS pipeline, see: U.S. patent application Ser. No. 14/151,643, entitled "Automaton Hardware Engine Employing Memory Efficient Transition Table Indexing", filed Jan. 9, 2014, by Gavin J. Stark et al. (the entire subject matter of which is incorporated herein by reference).

After the autopush block 109 and the event manager block 108 are set up by ME 89 in this way, the PCIe write request to configure the first NID occurs. As described above, the PCIe block 88 detects that the requested write is into the VF CONFIG PORTION of the PCIe address space. The PCIe-Gen3 target 202 in PCIe block 88 therefore replaces the upper 14-bit portion of the PCIe address with the 14-bit value 217. The 14-bit value 217 not only includes the DAT bit 170 that is set, but it also includes a "Generate Alert On Action" (GAA) bit 189, and this GAA bit 189 is also set. The 32-bit PCIe address with the upper 14-bit portion having been replaced in this way is then communicated from the PCIe block 88 to the CLS 97 as described above via DB island bridge 95. Within the CLS 97, the decoder 124 interprets the CLS command 123. Because the GAA bit 189 is set, and because the "Write Alert Enable" bit 190 in the configuration register 127 is set, the decoder 124 outputs a CLS operation code 172 whose "Alert On Write" bit 174 is set. The CLS operation code 172 is converted by translator 175 into op codes 191, and these op codes 191 are operated on by pipeline stages 137-142. The autopush block 109 monitors writes by the CLS pipeline into the CLS memory 107. When the CLS pipeline writes the configuration information via conductors 146 into the CLS memory 107, the autopush block 109 detects that the "Alert On Write Bit" 174 of the address supplied to the CLS memory 107 is set and also detects a write into the CLS memory 107. The autopush block 109 therefore takes the action it was previously set up to take in such a circumstance, namely it sends the preset event value 183 to the event manager 108 via conductors 192. When the event manager 108 receives the preset event value 183, the event manager 108 takes the action it was previously set up to take, namely it generates an event packet 184 that carries the event value 183, the SRAM address being written, an event type of "write alert", and an event source of "CLS in island 63". The event manager 108 outputs this event packet 184 onto event bus segment 193. The event packet 184 circulates around the event bus EB, segment by segment, and returns to the event manager 10 via event bus segment 194. The event filter #3 177 has been previously set up to detect such event packets. In response to detecting event packet 184, the event filter #3 177 sends a trigger 195 to the autopush block 109. The event information 196 carried by the event packet is captured and stored the event filter 177 for future reading. Due to the way the autopush block 109 was set up, when the autopush block 109 receives a trigger from the third event filter, the autopush block 109 injects the CLS operation code 198 as it was set up to do. Accordingly, the autopush block 109 injects the CLS operation code 198 into the pipeline. The CLS operation code 198 causes the execute stage 141 of the pipeline to read event information 196 from the third event filter 177 (the event information 196 includes the event value, and the SRAM address being written) via conductors 199, and causes the pipeline to push this event information 196 through push FIFO 105 and across the CPP bus into the transfer register 188 of the ME 89. Transfer register 188 is one register in the register file of the ME 89. The push into the transfer register 188 causes a signal within the ME 89 to be asserted. The ME 89 is a multi-threaded processor, one thread of which is preprogrammed to be awakened should this signal be asserted. The ME 89 uses the event value as to key to associate the returned event information 196 with the alert that the ME had previously set up the CLS transactional memory to issue. In this case, the alert indicates that the VF CONFIG PORTION 136 of the CLS memory space has been written to.

Although certain specific embodiments are described above for instructional purposes, the teachings of this patent document have general applicability and are not limited to the specific embodiments described above. A transactional memory that has programmable address translation and programmable write alert functionality, where these functions are selectively and independently enabled on an individual access basis by separate control bits in the incoming transactional memory command, is not limited to use in NIDs and to supporting virtual NID operations, but rather is a transactional memory of general utility. Accordingly, various modifications, adaptations, and combinations of various features of the described embodiments can be practiced without departing from the scope of the invention as set forth in the claims.

What is claimed is:

1. A transactional memory, comprising:
a memory; and
interface and decoding circuit that receives a command onto the transactional memory via a bus, wherein the command includes an incoming address and a "Do Address Translation" (DAT) bit, wherein if the command is a command to access the memory and the DAT bit is set then the interface and decoding circuit performs address translation on the incoming address by deleting certain bits and shifting other bits of the incoming address thereby generating a translated address so that the transactional memory uses the translated address to access the memory, whereas if the DAT bit is not set then the interface and decoding circuit does not perform address translation but rather the transactional memory uses the incoming address to access the memory, and wherein the transactional memory is not a processor that fetches instructions.

2. The transactional memory of claim 1, wherein the transactional memory comprises an address translation enable/disable bit, wherein if the address translation enable/disable bit stores a first digital logic value then the interface and decoding circuit can perform the address translation provided that the DAT bit is set, whereas if the address translation enable/disable bit stores a second digital logic value then the interface and decoding circuit is disabled from performing the address translation.

3. The transactional memory of claim 1, wherein the transactional memory comprises an address translation circuit that performs the address translation and further comprises a configuration register, wherein the configuration register supplies configuration information to the address translation circuit.

4. The transactional memory of claim 3, wherein configuration information stored in the configuration register determines which bits of the incoming address will be deleted in the address translation to generate the translated address.

5. The transactional memory of claim 1, wherein configuration information stored in the configuration register determines which bits of the incoming address will be shifted in bit position to generate the translated address.

6. The transactional memory of claim 1, wherein configuration information stored in the configuration register determines a base address that will be ORed with shifted-down bits of the incoming address in order to generate the translated address.

7. The transactional memory of claim 1, wherein configuration information stored in the configuration register determines whether a padding bit will be incorporated into the translated address.

8. The transactional memory of claim 1, wherein the interface and decoding circuit comprises:
   a pipeline, wherein the pipeline is coupled to the memory; and
   a plurality of interface FIFO (First In First Out) memories that interface the pipeline to a bus.

9. A method comprising:
   (a) receiving a command onto a transactional memory, wherein the command includes an incoming address and a "Do Address Translation" (DAT) bit;
   (b) if the DAT bit is set and if the transactional memory is enabled to perform address translation then performing address translation on the incoming address thereby generating a translated address, wherein the address translation involves deleting certain bits and shifting other bits of the incoming address to generate the translated address; and (c) if the DAT bit is set and if the transactional memory is enabled to perform address translation then using the translated address to access a memory of the transactional memory, otherwise if either the DAT bit is not set or if the transactional memory is not enabled to perform address translation then using the incoming address to access the memory, wherein (a), (b) and (c) are performed by the transactional memory, wherein the transactional memory is not a processor that fetches instructions.

10. The method of claim 9, wherein the command is taken from the group consisting of: a command to write to the memory of the transactional memory, and a command to read the memory of the transactional memory.

11. The method of claim 9, wherein the transactional memory comprises an address translation enable/disable bit, wherein if the address translation enable/disable bit stores a first digital logic value then the interface and decoding circuit can perform address translation provided that the DAT bit is set, whereas if the address translation enable/disable bit stores a second digital logic value then the interface and decoding circuit is disabled from performing the address translation.

12. The method of claim 9, wherein the transactional memory comprises an address translation circuit that performs the address translation of (b) and further comprises a configuration register, wherein the configuration register supplies configuration information to the address translation circuit.

13. The method of claim 12, wherein configuration information stored in the configuration register determines which bits of the incoming address will be deleted in the address translation to generate the translated address.

14. The method of claim 12, wherein configuration information stored in the configuration register determines which bits of the incoming address will be shifted in bit position to generate the translated address.

15. The method of claim 12, wherein configuration information stored in the configuration register determines a base address that will be ORed with shifted-down bits of the incoming address in order to generate the translated address.

16. The method of claim 12, wherein configuration information stored in the configuration register determines whether a padding bit will be incorporated into the translated address.

17. A transactional memory, comprising:
   a memory; and
   means for receiving a command onto the transactional memory, wherein the command includes an incoming address and a "Do Address Translation" (DAT) bit, wherein if the command is a command to access the memory and the DAT bit is set then the means performs address translation on the incoming address by deleting certain bits and shifting other bits of the incoming address thereby generating a translated address that the means then uses to access the memory, whereas if the DAT bit is not set then the means uses the untranslated incoming address to access the memory, wherein the transactional memory is not a processor that fetches instructions.

18. The transactional memory of claim 17, wherein the means is for storing an address translation enable/disable bit.

19. The transactional memory of claim 17, wherein the means is also for storing address translation configuration information, wherein the address translation configuration information determines which bits of the incoming address will be deleted in the address translation to generate the translated address.

20. The transactional memory of claim 17, wherein the means is also for storing address translation configuration information, wherein the address translation configuration information determines which bits of the incoming address will be shifted in bit position to generate the translated address.

* * * * *